(12) United States Patent
Lord et al.

(10) Patent No.: US 10,618,401 B2
(45) Date of Patent: *Apr. 14, 2020

(54) MOBILE PLATFORM FOR MATERIALS TRANSPORT

(71) Applicant: CLEARPATH ROBOTICS INC., Kitchener (CA)

(72) Inventors: Matthew Lord, Kitchener (CA); Roydyn Clayton, Seattle, WA (US); Michael Irvine, Mississauga (CA); Ryan Christopher Gariepy, Kitchener (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,704

(22) Filed: Mar. 1, 2019

(65) Prior Publication Data
US 2019/0263250 A1    Aug. 29, 2019

Related U.S. Application Data

(63) Continuation of application No. 15/257,233, filed on Sep. 6, 2016, now Pat. No. 10,245,935.
(Continued)

(51) Int. Cl.
*B62D 61/12*    (2006.01)
*B60K 7/00*    (2006.01)
(Continued)

(52) U.S. Cl.
CPC .............. *B60K 7/00* (2013.01); *B60B 35/006* (2013.01); *B60K 7/0007* (2013.01); *B60K 17/00* (2013.01);
(Continued)

(58) Field of Classification Search
CPC .......... B62D 61/12; B62D 61/10; B60K 7/00; B60K 7/0007; B60K 2007/0046;
(Continued)

(56) References Cited

U.S. PATENT DOCUMENTS

4,700,968 A * 10/1987 Cherry ................... B62D 61/12
180/290
4,730,685 A *  3/1988 Sinkkonen ................ B64F 1/22
180/14.3
(Continued)

*Primary Examiner* — James A English
(74) *Attorney, Agent, or Firm* — Bereskin & Parr LLP/S.E.N.C.R.L.,s.r.l.

(57) ABSTRACT

A mobile platform for materials transport is provided. The platform includes a pair of suspension devices that in turn include a pair of rocker beams which can be rotated between two positions: a first position where central wheels attached thereto can be used to drive the platform; and a second position where the central wheels are retracted and the platform can be rolled on end wheels without the friction of the central wheels, and an associated drive system, impeding movement of the platform. Furthermore, data from sensors and/or load cells can be used to control movement of the platform; specifically shifts in load distribution and/or sensed forces at the suspension devices can indicate that a load (and/or materials) has shifted and/or is shifting and movement of the platform is adjusted accordingly, for example to prevent the platform and/or the load (and/or materials) from tipping.

20 Claims, 5 Drawing Sheets

Related U.S. Application Data (60) Provisional application No. 62/219,696, filed on Sep. 17, 2015.

(51) Int. Cl.
  *B60K 17/00* (2006.01)
  *B66F 9/06* (2006.01)
  *B60B 35/00* (2006.01)
  *B62D 61/10* (2006.01)

(52) U.S. Cl.
  CPC .............. *B62D 61/10* (2013.01); *B62D 61/12* (2013.01); *B66F 9/063* (2013.01); *B60K 2007/0046* (2013.01); *B60K 2007/0092* (2013.01); *B60Y 2200/62* (2013.01)

(58) Field of Classification Search
  CPC .......... B60K 2007/0092; B60N 35/006; B66F 9/063; B60Y 2200/62
  See application file for complete search history.

(56) References Cited

U.S. PATENT DOCUMENTS

| | | | |
|---|---|---|---|
| 4,817,747 A * | 4/1989 | Kopczynski | B60B 19/00 180/22 |
| 5,332,052 A * | 7/1994 | Carnevale | B60K 5/10 180/14.2 |
| 5,526,890 A * | 6/1996 | Kadowaki | B60K 17/358 180/209 |
| 2004/0164505 A1* | 8/2004 | Clemens | B60K 7/0007 280/6.154 |
| 2013/0054126 A1* | 2/2013 | Lazzari | B62D 37/06 701/124 |
| 2015/0091262 A1* | 4/2015 | Bekoscke | A61G 5/043 280/5.508 |
| 2017/0144502 A1* | 5/2017 | Bae | B62D 61/12 |

\* cited by examiner

MOBILE PLATFORM FOR MATERIALS TRANSPORT

CROSS-REFERENCE TO RELATED PATENT APPLICATIONS

The application is a continuation of U.S. patent application Ser. No. 15/257,233 filed on Sep. 6, 2016, which claims the benefit of U.S. Provisional Application No. 62/219,696, filed on Sep. 17, 2015. The entire contents of each of U.S. patent application Ser. No. 15/257,233 and U.S. Provisional Application No. 62/219,696 is hereby incorporated by reference.

FIELD

The specification relates generally to vehicles and/or autonomous vehicles, and specifically to a mobile platform for materials transport.

BACKGROUND

Mobile platforms for transporting loads and/or materials can include autonomous vehicles and/or robots, used for warehouse applications. Hence such mobile platforms can be configured to carry heavy loads and hence, in turn, are themselves heavy and/or challenging to manoeuver. For example, care must be taken when such platforms are transporting heavy loads so as to not tip the loads. Furthermore, when such platforms are in a manual mode and/or powered down, they can be difficult to manoeuver manually as the drive systems for such platforms inherently have a great deal of internal resistance.

SUMMARY

In general, this disclosure is directed to a mobile platform for materials transport that includes pair of suspension devices that, in turn, include a pair of rocker beams onto which is connected a pair of central wheels, at around a centre of a chassis, and a pair of first end wheels at a first end of the chassis. The platform includes one or more second end wheels at an end opposite the pair of first end wheels. The rocker beams rotate between at least two positions, where the pair of central wheels extend from a bottom portion of the chassis in a first position, and the pair of central wheels retract towards the chassis in the second position. Hence, in the first position, the central wheels can be in contact with the ground and be used to drive the platform, for example using a drive system, and in the second position, the central wheels can be retracted towards the chassis such that the end wheels are in contact with the ground while the central wheels are not. Hence, in the second position, the platform can be manually moved on the end wheels without the resistance of the central wheels impeding the movement of the platform. Furthermore, the platform can include load cells, for example at a load bearing surface of the platform, and sensors positioned to sense one or more of force, a strain, and a rotation of one or more of the pair of suspension devices. Data from each of the load cells and the sensors can be used to control movement of the platform; specifically, shifts load distribution and/or sensed forces at the suspension devices can indicate that a load has shifted and/or is shifting and movement of the platform is adjusted accordingly, for example to prevent the platform and/or the load from tipping.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a mobile platform comprising: a chassis comprising a first end, a second end distal the first end, and opposite sides extending there between; a pair of suspension devices located on the opposite sides, each comprising: a respective rocker beam, pivotally connected to a respective side, and extending from about a centre of the chassis to about the first end, and being one of a pair of rocker beams; a respective central wheel connected to the rocker beam at about the centre, and being one of a pair of central wheels; and, a respective first end wheel connected to the rocker beam at about the first end, and being one of a pair of first end wheels; and, one or more second end wheels located at the second end, each of the pair of rocker beams configured to rotate between at least: a first position, the pair of central wheels extending outwards from a bottom portion of the chassis in the first position, such that the chassis rolls using at least the pair of central wheels; and, a second position, the pair of central wheels retracting towards the bottom portion in the second position, such that the chassis rolls using the pair of first end wheels, and the one or more second end wheels without the pair of central wheels.

In the first position, the pair of central wheels, the pair of first end wheels, and the one or more second end wheels can all be configured to contact ground, and in the second position, the pair of first end wheels, and the one or more second end wheels are configured to contact the ground, the pair of central wheels being retracted.

The mobile platform can further comprise a pair of actuation devices configured to rotate the pair of rocker beams between the first position and the second position. Each of the pair of actuation devices can be located on a top side of the chassis, and between the pair of first end wheels and respective pivot points of the pair of rocker beams. The pair of actuation devices can comprise a pair of jackscrews positioned in respective complementary threaded apertures in the chassis and configured to urge the pair of rocker beams from the first position to the second position when the pair of jackscrews are actuated downward, and release the pair of rocker beams from the second position to the first position when the pair of jackscrews are actuated upward.

Each of the pair of first end wheels and the one or more second end wheels can comprise a respective caster wheel.

The mobile platform can further comprise a further suspension device extending between the opposite sides of the chassis at the second end, the one or more second end wheels attached to the further suspension device.

The one or more second end wheels can comprise: a pair of second end wheels located at second end corners of the chassis.

Each of the pair of rocker beams can further comprises a respective pivot point located between the respective central wheel and the respective first end wheel.

The mobile platform can further comprise a drive system configured to drive the pair of central wheels. The drive system can comprise a differential drive motor pair. The drive system can connect the pair of central wheels, and the drive system is further configured to move together with the pair of central wheels when the pair of rocker beams rotate. The chassis can comprises a space into which the drive system can move when the pair of rocker beams rotate from the first position to the second position.

The mobile platform can further comprise one or more sensors positioned to sense one or more of force, a strain, and a rotation of one or more of the pair of suspension devices.

The mobile platform can further comprise one or more load cells configured to sense a load on the chassis.

The mobile platform can further comprise: a drive system configured to drive the pair of central wheels; one or more sensors positioned to sense one or more of force, a strain, and a rotation of one or more of the pair of suspension devices; one or more load cells configured to sense a load on the chassis; and, a control device in communication with the one or more sensors and the one or more load cells, the control device configured to adjust operation of the drive system according to data received from the one or more sensors and the one or more load cells. The control device can be further configured to moderate speed of the drive system when the data received from the one or more sensors and the one or more load cells indicates one or more of: bumps encountered by the pair of central wheels; and load instability.

The mobile platform can further comprise one or more lift points.

The mobile platform can further comprise a fairing.

The mobile platform can further comprise one or more of: a remote controlled vehicle, a remote guided vehicle, a robot, and an autonomous vehicle.

Another aspect of the application provides a method comprising: at a mobile platform comprising: a chassis comprising a first end, a second end distal the first end, and opposite sides extending there between; a pair of suspension devices located on the opposite sides, each comprising: a respective rocker beam, pivotally connected to a respective side, and extending from about a centre of the chassis to about the first end, and being one of a pair of rocker beams; a respective central wheel connected to the rocker beam at about the centre, and being one of a pair of central wheels; and, a respective first end wheel connected to the rocker beam at about the first end, and being one of a pair of first end wheels; one or more second end wheels located at the second end, each of the pair of rocker beams configured to rotate between at least: a first position, the pair of central wheels extending outwards from a bottom portion of the chassis in the first position, such that the chassis rolls using at least the pair of central wheels; and, a second position, the pair of central wheels retracting towards the bottom portion in the second position, such that the chassis rolls using the pair of first end wheels, and the one or more second end wheels without the pair of central wheels; a drive system configured to drive the pair of central wheels; one or more sensors positioned to sense one or more of force, a strain, and a rotation of one or more of the pair of suspension devices; one or more load cells configured to sense a load on the chassis; and, a control device in communication with the one or more sensors and the one or more load cells, adjusting operation of the drive system according to data received from the one or more sensors and the one or more load cells. The method can further comprise moderating speed of the drive system when the data received from the one or more sensors and the one or more load cells indicates one or more of: bumps encountered by the pair of central wheels; and load instability.

A further aspect of the specification provides a method comprising: at a mobile platform comprising: a drive system configured to drive a pair of central wheels; one or more sensors positioned to sense one or more of force, a strain, and a rotation of one or more of a pair of suspension devices that extend between the central wheels and first end wheels; one or more load cells configured to sense a load on a chassis; and, a control device in communication with the one or more sensors and the one or more load cells, adjusting operation of the drive system according to data received from the one or more sensors and the one or more load cells. The method can further comprise moderating speed of the drive system when the data received from the one or more sensors and the one or more load cells indicates one or more of: bumps encountered by the pair of central wheels; and load instability.

Yet a further aspect of the specification provides a computer-readable medium storing a computer program, wherein execution of the computer program is for: at a mobile platform comprising: a chassis comprising a first end, a second end distal the first end, and opposite sides extending there between; a pair of suspension devices located on the opposite sides, each comprising: a respective rocker beam, pivotally connected to a respective side, and extending from about a centre of the chassis to about the first end, and being one of a pair of rocker beams; a respective central wheel connected to the rocker beam at about the centre, and being one of a pair of central wheels; and, a respective first end wheel connected to the rocker beam at about the first end, and being one of a pair of first end wheels; one or more second end wheels located at the second end, each of the pair of rocker beams configured to rotate between at least: a first position, the pair of central wheels extending outwards from a bottom portion of the chassis in the first position, such that the chassis rolls using at least the pair of central wheels; and, a second position, the pair of central wheels retracting towards the bottom portion in the second position, such that the chassis rolls using the pair of first end wheels, and the one or more second end wheels without the pair of central wheels; a drive system configured to drive the pair of central wheels; one or more sensors positioned to sense one or more of force, a strain, and a rotation of one or more of the pair of suspension devices; one or more load cells configured to sense a load on the chassis; and, a control device in communication with the one or more sensors and the one or more load cells, adjusting operation of the drive system according to data received from the one or more sensors and the one or more load cells. Execution of the computer program can be further for: moderating speed of the drive system when the data received from the one or more sensors and the one or more load cells indicates one or more of: bumps encountered by the pair of central wheels; and load instability. The computer-readable medium can comprise a non-transitory computer-readable medium.

Yet a further aspect of the specification provides a computer-readable medium storing a computer program, wherein execution of the computer program is for: at a mobile platform comprising: a drive system configured to drive a pair of central wheels; one or more sensors positioned to sense one or more of force, a strain, and a rotation of one or more of a pair of suspension devices that extend between the central wheels and first end wheels; one or more load cells configured to sense a load on a chassis; and, a control device in communication with the one or more sensors and the one or more load cells, adjusting operation of the drive system according to data received from the one or more sensors and the one or more load cells. The method can further comprise moderating speed of the drive system when the data received from the one or more sensors and the one or more load cells indicates one or more of: bumps encountered by the pair of central wheels; and load instability. Execution of the computer program can be further for: moderating speed of the drive system when the data received from the one or more sensors and the one or more load cells indicates one or more of: bumps encountered by the pair of central wheels; and load instability. The computer-readable medium can comprise a non-transitory computer-readable medium.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
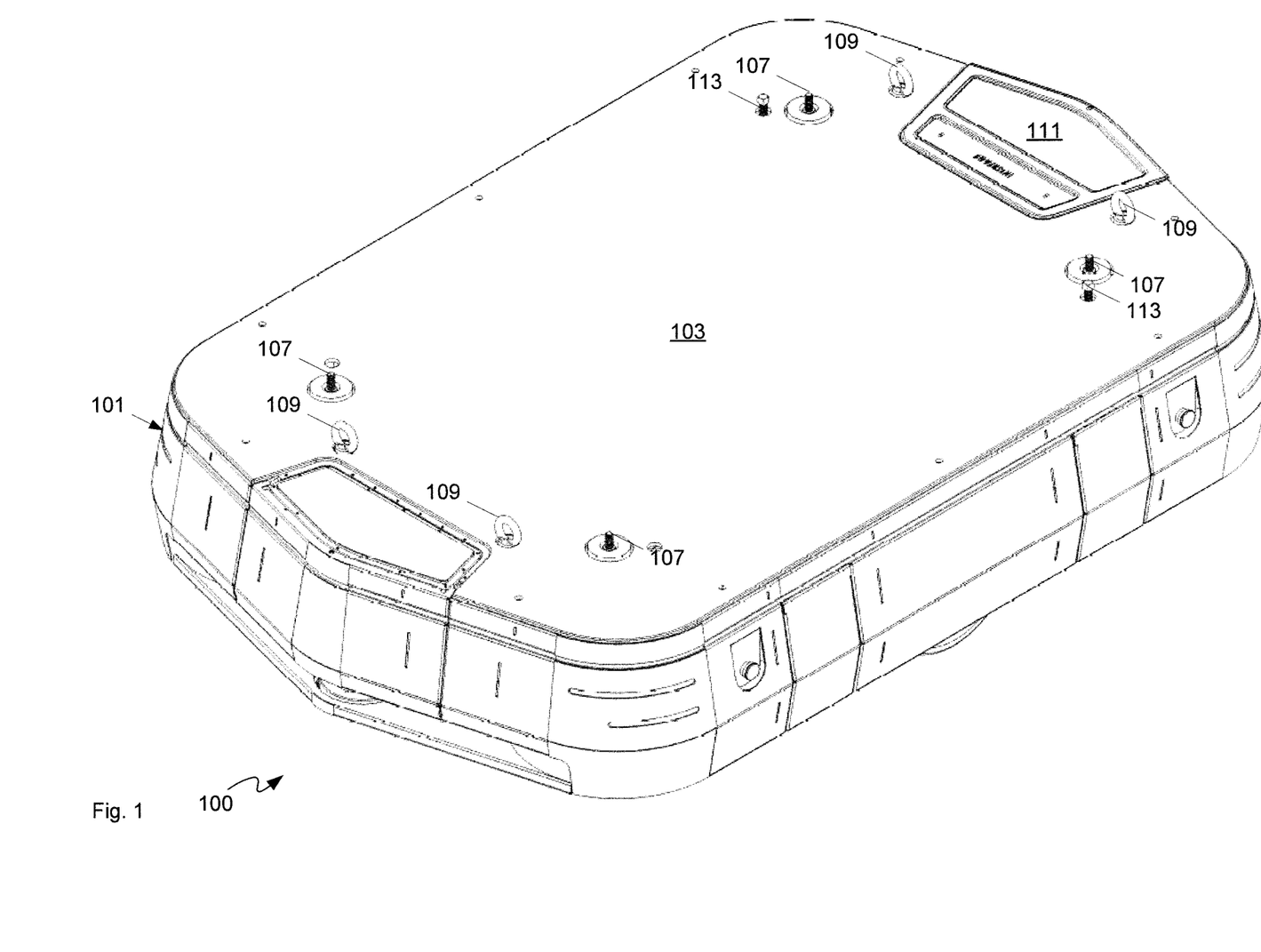
FIG. 1 depicts a perspective view of a mobile platform for materials transport, according to non-limiting implementations.
Figure 2:
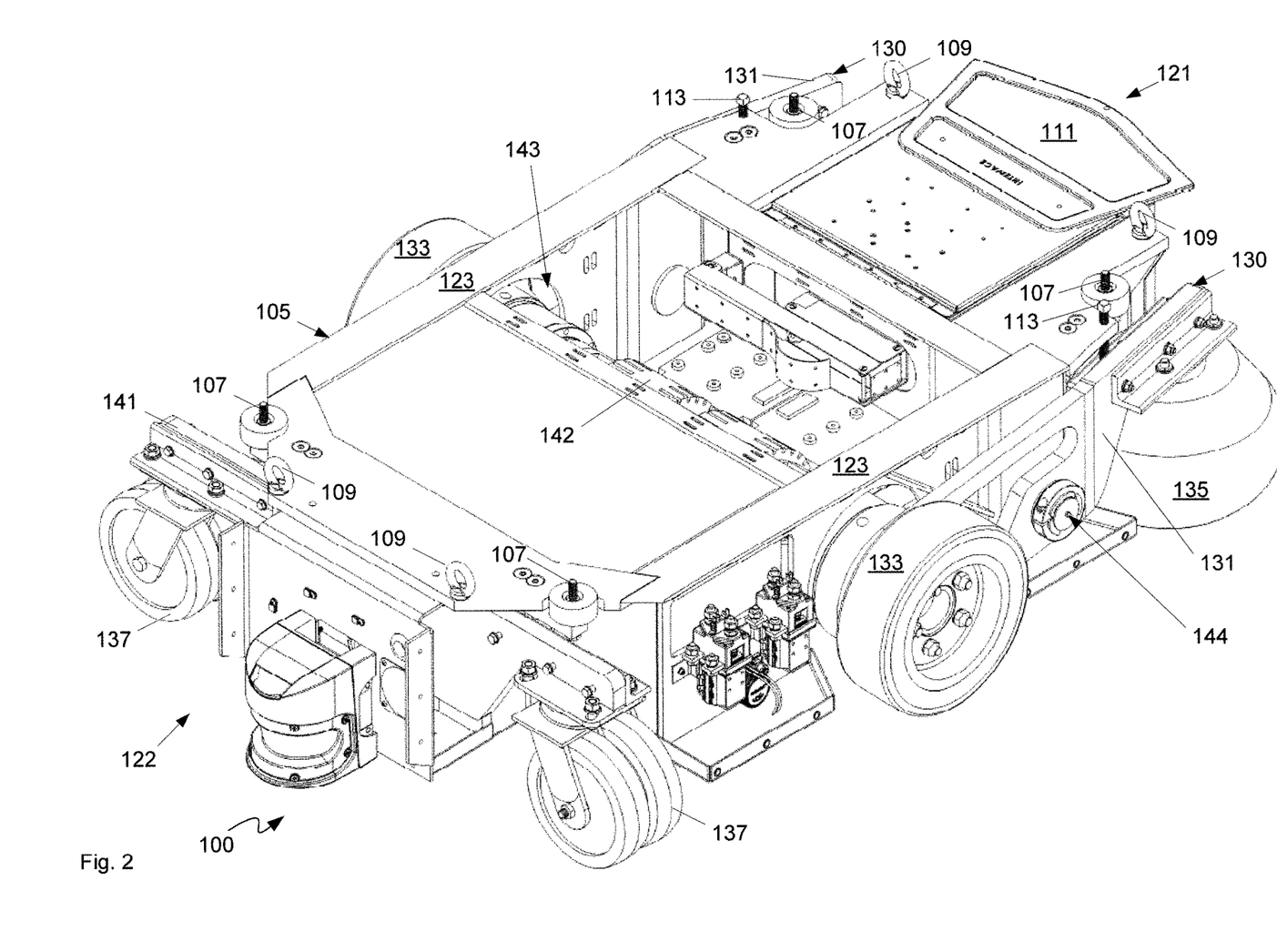
FIG. 2 depicts a perspective view of the mobile platform of FIG. 1 in a partially disassembled state, according to non-limiting implementations.

FIGS. 1 and 2 respectively perspective views of a mobile platform 100 for materials transport, according to non-limiting implementations; in particular, FIG. 1 depicts mobile platform 100 in an assembled state, that includes a fairing 101, and a load bearing platform 103, while FIG. 2 depicts mobile platform 100 in a partially disassembled state with fairing 101, and load bearing platform 103 removed to show a chassis 105 as well as various other components of mobile platform 100, described in further detail below. Mobile platform 100 will be interchangeably referred to hereafter as platform 100. Chassis 105 can comprise an internal chassis, however chassis 105 need not be internal to platform 100.

Platform 100 can generally comprise one or more of a robot, an unmanned ground vehicle, an unmanned surface vehicle, amphibious vehicles, any other suitable vehicle, and/or a combination, and the like, configured to receive commands, for example from a server and/or a controller device via a network to move to a given coordinate and/or perform a given task, and implement movement to the given coordinate and/or performance of the given task without a person on board. In other words, platform 100 can comprise a remote controlled and/or remote guided vehicles and/or an autonomous vehicle which can operate without human intervention in the environment. As depicted, in FIG. 1, platform 100 comprises a wheeled land vehicle and, in particular, a wheeled vehicle that can be used within a warehouse to one or more of move and/or carry inventory and/or items within the warehouse and/or perform tasks within the warehouse for example by interacting with features within the warehouse including, but not limited to, conveyors and the like. It should be emphasized that the shape and structure of platform 100 in FIGS. 1 and 2 are purely examples, and contemplate a device that can be used for autonomous and/or remote controlled wheeled movement. However, FIG. 1 contemplates a device that can be used for any suitable specialized functions, including, but not limited to, one or more of, warehouse applications, environmental applications, farming applications, and/or any application that can be implemented by a wheeled vehicle.

In particular, platform 100 is configured to receive and carry loads, for example on load bearing platform 103, for example in a warehouse environment. The term "load" can generally be interchangeable with the term "materials". Hence, alternatively, platform 100 is configured to receive and carry materials, and can be referred to as a mobile platform for materials transport.

In some implementations, as depicted in FIGS. 1 and 2, platform 100 can further comprise one or more optional load cells 107 configured to sense a load on chassis 105 and/or load bearing platform 103 and/or platform 100 in general, presuming that any load carried by platform 100 is placed on, and/or is in contact with, load cells 107. As depicted, platform 100 comprises four load cells 107, one at each corner, and/or proximal each corner, of chassis 105 and/or load bearing platform 103 and/or platform 100, and in communication with a processor (described in more detail below). However, platform 100 can comprise as fewer than four load cells 107 and more than four load cells 107, located at any position where a load can be sensed. Load cells 107 are generally attached to chassis 105, and at least a portion of load cells 107 extend through corresponding apertures in load bearing platform 103, as depicted in FIG. 1. Hence, when a load is received on load bearing platform 103, and is in contact with load cells 107 (e.g. presuming that any load carried by platform 100 is placed on, and/or is in contact with, load cells 107), shifts in weight in the load can be sensed by receiving data from load cells 107, as described in more detail below.

As depicted, platform 100 further comprises one or more optional lift points 109, connected to chassis 105, lift points 109 extending through corresponding apertures in load bearing platform 103, as depicted in FIG. 1. As depicted, platform 100 comprises four lift points 109, one at each corner, and/or proximal each corner, of chassis 105 and/or load bearing platform 103 and/or platform 100. However, platform 100 can comprise as fewer than four lift points 109 and more than four lift points 109. As depicted each lift point 109 comprises a heavy-duty eye latch connected to chassis 105, such that corresponding hooks, and the like, can be attached thereto in order to lift platform 100, for example for transportation.

As depicted, platform 100 can further comprise a control component 111, which can be removable, control component 111 generally configured to communicate with an external control device, such as a server, controller device and the like, via a network, and control platform 100 based on commands received therefrom. Control component 111 can further control platform 100 based on data received from load cells 107 and/or other sensors of platform 100 described in more detail below.

As depicted in FIGS. 1 and 2, platform 100 further comprises a pair of actuation devices 113 located on a top side of chassis 105 and extending through corresponding apertures of load bearing platform 103, as described in further detail below.

While not depicted and/or described in detail, platform 100 can further comprise other components suitable for unmanned vehicles including, but not limited to, running lights, obstacle sensing devices, inertial measurement devices, Global Positioning System (GPS) devices, batteries, battery bays, latches, pushbuttons and the like for activating various functions and/or features of platform 100 (including, but not limited to and on/off button), etc.

Attention is next directed to FIG. 2 which shows details of components connected to chassis 105. As depicted in FIG. 2, chassis 105 generally comprises a first end 121, a second end 122 distal first end 121, and opposite sides 123 extending there between. Indeed, as depicted, chassis 105 (and platform 100) has a generally elongated structure, with sides 123 being longer than ends 121, 122; however, in other implementations, chassis 105 (and platform 100) can have a less elongated structure, with chassis 105 (and platform 100) being, for example, generally square, generally circular, and the like.

Furthermore, chassis 105 (and platform 100) generally comprises a top side, from which extend optional load cells 107 and/or optional lift points 109, and a bottom side opposite the top side. In some implementations, first end 121 can comprise a front and, and hence second end 122 can comprise a back end; however, as platform 100 can move either with first end 121 leading or with second end 122 leading, the concepts of "front" and "back" may not necessarily apply to platform 100.

As also depicted in FIG. 2, platform 100 further comprises: a pair of suspension devices 130 located on opposite sides 123, each comprising: a respective rocker beam 131, pivotally connected to a respective side 123, and extending from about a centre of chassis 105 to about first end 121, and being one of a pair of rocker beams 131; a respective central wheel 133 connected to rocker beam 131 at about the centre, and being one of a pair of central wheels 133; and, a respective first end wheel 135 connected to rocker beam 131 at about first end 121, and being one of a pair of first end wheels 135; and, one or more second end wheels 137 located at second end 122. As will be discussed in more detail with regard to FIG. 3, each of pair of rocker beams 131 are configured to rotate between at least: a first position, pair of central wheels 133 extending outwards from a bottom portion of chassis 105 in the first position, such that the chassis 105 rolls using at least the pair of central wheels 133; and, a second position, the pair of central wheels 133 retracting towards the bottom portion in the second position, such that the chassis 105 rolls using the pair of first end wheels 135, and the one or more second end wheels 137 without the central wheels 133.

It is appreciated that in FIG. 2 details of only one suspension device 130 is visible but that a second suspension device 130 is present on an opposite side of chassis 105, and indeed, suspension devices 130, as depicted, are generally symmetrical about a longitudinal axis of chassis 105.

Furthermore, first end wheels 135 are depicted as caster wheels with a range of motion of first end wheels 135 depicted in FIG. 2 rather than the wheels themselves. For example, first end wheels 135 extend from a bottom side of a first end portion of respective rocker beams 131, and rotate 360° about a respective attachment point to a respective rocker beam 131. For example, first end wheels 135 can be similar to second end wheels 137, which are clearly depicted in FIG. 2 as comprising caster wheels, according to non-limiting implementations.

Furthermore, as depicted, platform 100 comprises a further suspension device 141 extending between opposite sides 123 of chassis 105 at second end 122, one or more second end wheels 137 attached to further suspension device 141. In particular, as depicted, one or more second end wheels 137 comprises: a pair of second end wheels 137 located at second end corners of chassis 105. For example, as depicted, further suspension device 141 comprises a suspension arm extending across second end 122, for example perpendicular to a longitudinal axis of chassis 105, with one or more second end wheels 137 comprising respective caster wheels extending from a bottom side of the suspension arm at opposite ends thereof. Hence, as depicted, each of the pair of first end wheels 135 and one or more second end wheels 137 comprises a respective caster wheel. Further, the number of second end wheels can be as few as one, or more than two. When only one second end wheel is present, the one second end wheel is generally located along the longitudinal axis of chassis 105.

As also depicted in FIG. 2, platform 100 further comprises a drive system 142 configured to drive the pair of central wheels 133. As depicted, drive system 142 comprises a differential drive motor pair that connects pair of central wheels 133, however, in other implementations, drive system 142 need not connect pair of central wheels 133; for example, drive system 142 can comprise two motors, one for each central wheel 133, which are separated from each other. However, as depicted, drive system 142 connects the pair of central wheels 133 and, as will be explained in further detail below, drive system 142 is further configured to move together with the pair of central wheels 133 when the pair of rocker beams 131 rotate. For example, as drive system 142 generally extends between pair of central wheels 133 through chassis 105, chassis includes a space 143 into which drive system 142 can move when pair of rocker beams 131 rotate from the first position to the second position.

In particular, as also depicted in FIG. 2, each of pair of rocker beams 131 further comprises a respective pivot point 144 located between a respective central wheel 133 and a respective first end wheel 135. Each pivot point 144 can comprise a pivot connection and/or a rotational connection to chassis 105. Hence, each of the pair rocker beams 131 can rotate in a manner that extends and retracts a respective central wheel 133, for example when actuated by a respective actuation device 113, as described hereafter.

Figure 3:
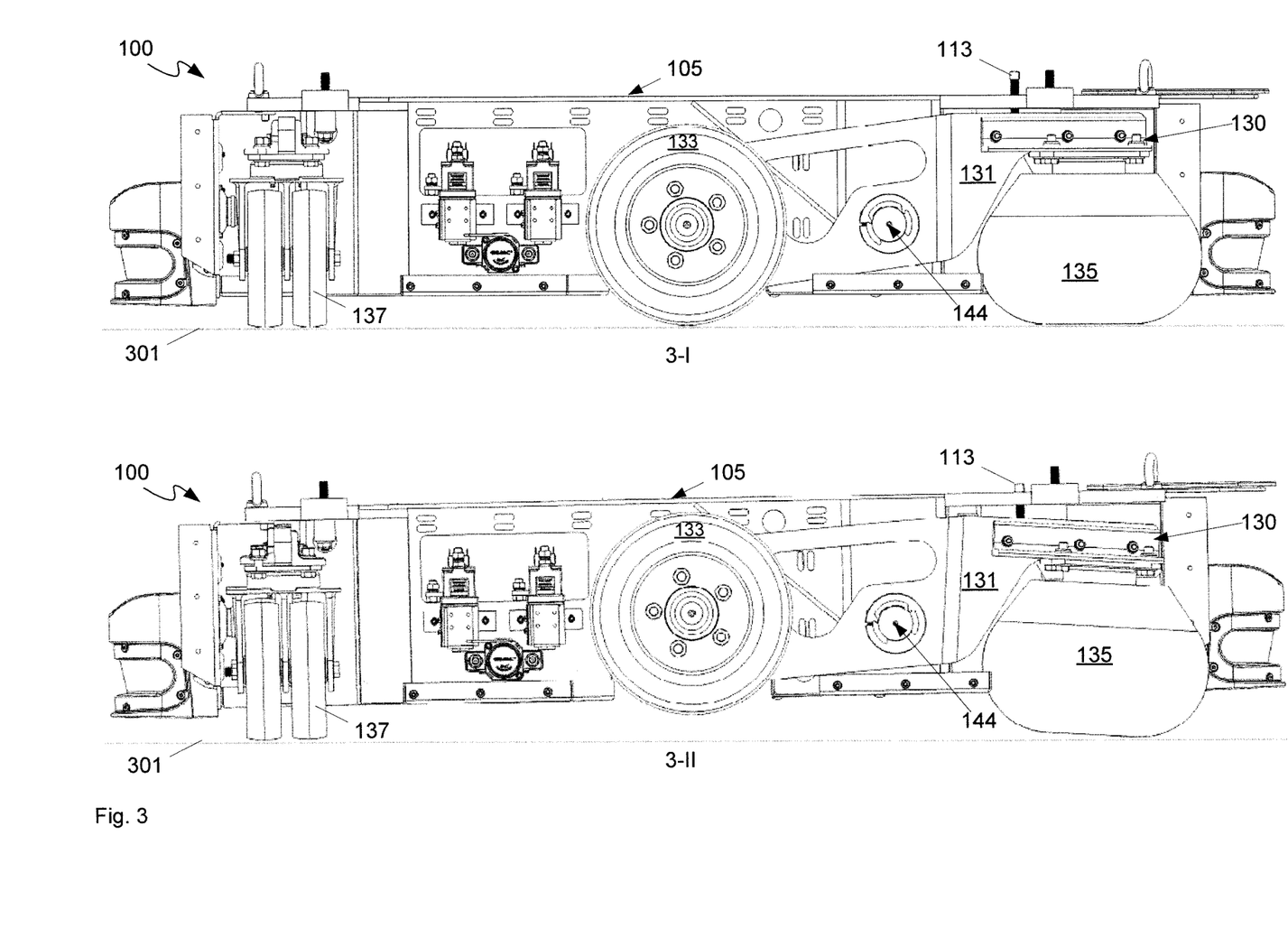
FIG. 3 depicts side views of the mobile platform of FIG. 1, with the fairing removed, and rocker beams in two positions, according to non-limiting implementations.

Attention is next directed to FIG. 3 which depicts two side views 3-I, 341 of platform 100 with fairing 101 and load bearing platform 103 removed, as in FIG. 2. In particular, view 3-I depicts rocker beams 131 in the first position, and view 3-II depicts rocker beams 131 in the second position.

For example, in the first position depicted in view 3-I, rocker beams 131 are rotated to a position where central wheels 133 are in contact with ground 301. Ground 301 is appreciated to be any surface on which platform 100 is resting. In particular, in the first position, pair of central wheels 133 extends outwards from a bottom portion of chassis 105 such that chassis 105 and/or platform 100 rolls using at least pair of central wheels 133. Indeed, in the depicted implementation, in the first position, pair of central wheels 133, pair of first end wheels 135, and one or more second end wheels 137 are all configured to contact the ground 301. This configuration can compensate for variances in ground contours of ground 301, such that contact between pair of central wheels 133 and ground 301 can be maximized. Hence, in the first position, as depicted, a bottom of each of pair of central wheels 133, pair of first end wheels 135, and one or more second end wheels 137 are all aligned with, and resting on, ground 301.

However, in other implementations, in the first position, a bottom of pair of central wheels 133, can be lower than the bottom of one or more of pair of first end wheels 135, and one or more second end wheels 137 such that chassis 105 rocks between pair of first end wheels 135, and one or more second end wheels 137 using pair of central wheels 133 as a pivot. In any event, in the first position, drive system 142 can be operated to rotate and/or move and/or operate pair of central wheels 133 in order to drive and/or move and/or operate platform 100; as drive system 142 can comprise a differential drive motor pair, in the first position, platform can be moved forward, backward, left and/or right and/or generally steered using the combination of drive system 142 and pair of central wheels 133.

However, in the second position depicted in FIG. 2, pair of central wheels 133 are retracted towards the bottom portion of chassis 105, such that chassis 105 rolls using pair of first end wheels 135, and one or more second end wheels 137 without pair of central wheels 133. In particular, in the second position, pair of first end wheels 135, and one or more second end wheels 137 are configured to contact ground 301, pair of central wheels 133 being retracted and hence do not touch ground 301. In addition, drive system 142 is retracted towards and/or into space 143 in the second position.

When there is only one second end wheel 137, the only one second wheel 137 is generally located along a longitudinal axis of chassis 105 such that there are three contact points to the ground 301 in the second position that provide stability to platform 100, similar to a tricycle. Regardless, in the second position, pair of central wheels 133 are retracted towards chassis 105 such that pair of central wheels 133 no longer touch ground 301 and hence platform 100 can be rolled using only wheels 135, 137. As such, in the second position, platform 100 can easily be moved and/or pushed manually, for example on the caster wheels, without the combined friction of pair of central wheels 133 and drive system 142 inhibiting movement thereof.

Movement between the first position depicted in view 3-I and the second position depicted in view 3-II can be controlled using pair of actuation devices 113. In particular, pair of actuation devices 113 are configured to rotate pair of rocker beams 131 between the first position and the second position. For example, as depicted, each of the pair of actuation devices 113 is located on a top side of chassis 105, and between pair of first end wheels 135 and respective pivot points 144 of pair of rocker beams 131. In particular, as depicted, pair of actuation devices 113 comprises a pair of jackscrews positioned in respective complementary threaded apertures in chassis 105 and configured to urge pair of rocker beams 131 from the first position to the second position when the pair of jackscrews are actuated downward, and release pair of rocker beams 131 from the second position to the first position when the pair of jackscrews are actuated upward.

For example, as depicted, pair of rocker beams 131 are generally biased towards the first position, for example by a weight of pair of central wheels 133 being greater than a weight of pair of first end wheels 135 and/or by a position of pivot points 144 and/or by a distribution of mass of pair of rocker beams 131. In other words, rocker beams 131, central wheels 133, first end wheels 135 and pivot points 144 are configured to bias rocker beams 131 to the first position, for example by virtue of a combined centre of mass of rocker beams 131, central wheels 133, first end wheels 135 being located between pivot points 144 and central wheels 133. As drive system 142 connect central wheels 133, drive system 142 can further contribute to the combined centre of mass being located between pivot points 144 and central wheels 133.

In any event, when actuation devices 113 are moved downward to press on rocker beams 131, first end wheels 135 are moved downward and central wheels 133 retract towards chassis 105 to the second position when rocker beams 131 rotate about pivot points 144. When actuation devices 113 are moved upward, rocker beams 131 again rotate towards the first position about pivot points 144.

While actuation devices 113 are depicted as jackscrews, actuation device 113 can comprise any device configured to actuate rocker beams 131. For example, in some implementations, actuation devices 113 can comprise screws, gears, and the like configured to interact with complementary screws, gears and the like located at rocker beams 131.

Furthermore, while in present implementations biasing of rocker beams 131 is dependent on a combined centre of mass being located between pivot points 144 and central wheels 133, in other implementations, suspension devices 130 can further comprise respective biasing devices which bias rocker beams 131 towards the first position or the second position, with actuation devices 113 configured to work in accordance with the biasing devices to move rocker beams 131 between the first position and the second position. Such biasing devices can include, but are not limited to, springs, pistons, pneumatic devices, hydraulic devices and the like.

In addition, in other implementations, the combined centre of mass of can be located between pivot points 144 and first end wheels 135, such that rocker beams 131 are biased towards the second position, with actuation devices 113 adapted and/or positioned accordingly (e.g. between pivot points 144 and central wheels 133).

As depicted each of actuation devices 113 are configured to be operated manually. For example, each actuation device 113 comprises a jackscrew residing in a complementary threaded aperture in chassis 105, each jackscrew comprising a head which can be rotated using a wrench and/or a tool complementary to the head. Using such a wrench and/or tool, each jackscrew can be rotated up or down (e.g. with respect to ground 301) to in turn rotate rocker beams 131. However, in other implementations, platform 100 can further comprise one or more motors and/or stepper motors and the like which can rotate actuation devices 113 up or down to in turn rotate rocker beams 131.

Hence, it should be understood that in general a wide variety of configurations for platform 100 and/or suspension devices 130 are contemplated.

Figure 4:
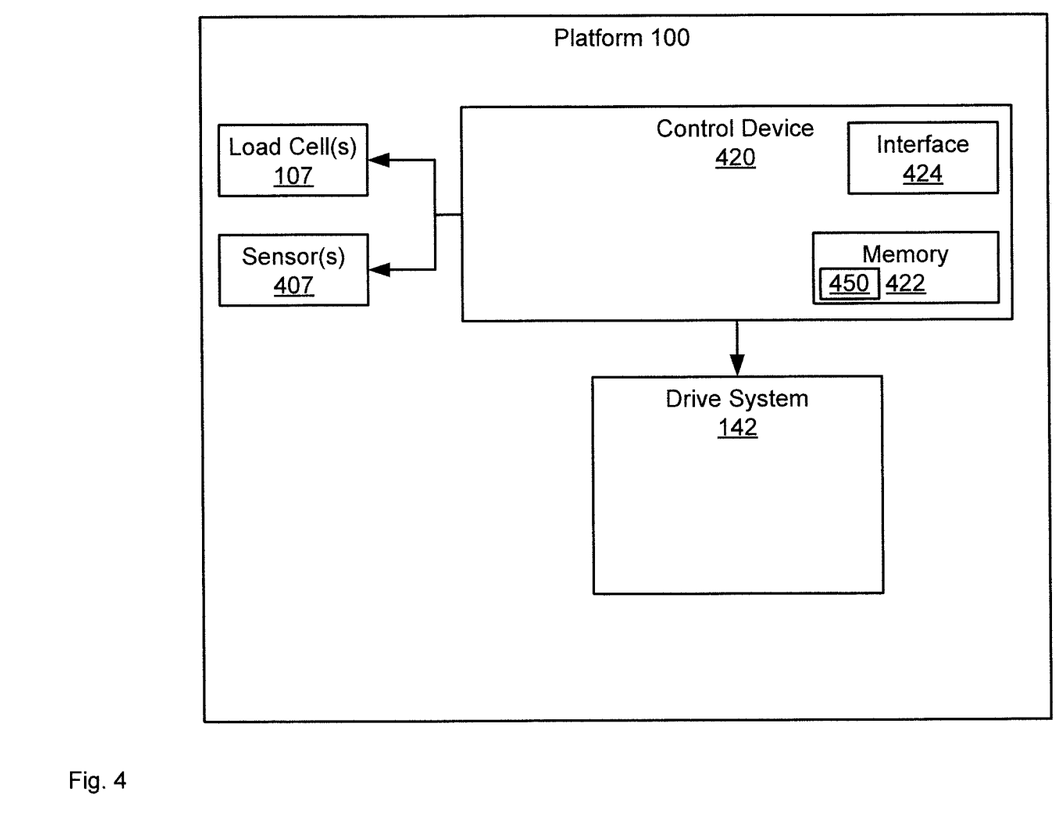
FIG. 4 depicts a schematic view of the mobile platform of FIG. 1, according to non-limiting implementations.

For example, attention is next directed to FIG. 4 which depicts a schematic block diagram of electronic components of platform 100, including one or more load cells 107, and drive system 142. Indeed, as depicted, such electronic components can further comprise one or more sensors 407 positioned to sense one or more of force, a strain, and a rotation of one or more of pair of suspension devices 130. Hence, sensors 407 can comprise one or more of strain gauges, accelerometers, rotational sensors and the like positioned to sense one or more of force, a strain, and a rotation of one or more of pair of suspension devices 130.

Electronic components of platform 100 can further include a control device 420, which can comprise a memory 422 and a communication interface 424. Control device 420 is generally in communication with one or more sensors 407 and one or more load cells 107. While not depicted, such electronic components can further include, but are not limited to, running lights, switches, motors for controlling actuation devices 113 and the like. Furthermore, while both load cells 107 and sensors 407 are depicted, in some implementations only load cells 107 are present, while in other implementations only sensors 407 are present.

Furthermore, control device 420 can be integrated into control component 111. For example control component 111 can comprise a physical chassis and control device 420, the physical chassis configured to protect control device 420.

Control device 420 can comprise a computing device, including but not limited to a robotics controller, a processing device, and the like. As depicted, control device 420 generally comprises memory 422 and an optional communication interface 424 (interchangeably referred to hereafter as interface 424) and optionally any suitable combination of input devices and display devices. Furthermore, control device 420 is in communication with each of one or more load cells 107, drive system 142 and one or more sensors 407, for example using a communication bus, and the like.

Control device 420 can further comprise a processor and/or a plurality of processors, including but not limited to one or more central processors (CPUs) and/or one or more processing units; either way, control device 420 comprises a hardware element and/or a hardware processor. Indeed, in some implementations, control device 420 can comprise an ASIC (application-specific integrated circuit) and/or an FPGA (field-programmable gate array) specifically configure to implement the functionality of control device 420. Hence, control device 420 is not necessarily a generic computing device, but a device specifically configured to implement specific functionality including controlling platform 100. For example, control device 420 can specifically comprise an engine configured to control platform 100.

Control device 420 is configured to utilize memory 422, which can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of control device 420 and/or platform 100 as described herein are typically maintained, persistently, in memory 422 and used by control device 420 which makes appropriate utilization of volatile storage during the execution of such programming instructions. Those skilled in the art recognize that memory 422 is an example of computer readable media that can store programming instructions executable on control device 420. Furthermore, memory 422 is also an example of a memory unit and/or memory module and/or a non-volatile memory.

In particular, memory 422 can stores an application 450 that, when processed by control device 420, enables control device 420 to adjust operation of drive system 142 according to data received from one or more sensors 407 and one or more load cells 107. For example, control device 420 can be further configured to moderate speed of drive system 142 when the data received from one or more sensors 407 and one or more load cells 107 indicates one or more of: bumps encountered by the pair of central wheels 133; and load instability.

Interface 424 comprises any suitable wired or wireless communication interface configured to communicate with an external controller, including, but not limited to a server, a remote robotics controller, and the like. For example, interface 424 can receive commands from the external controller and control device 420 can implement such commands.

Figure 5:
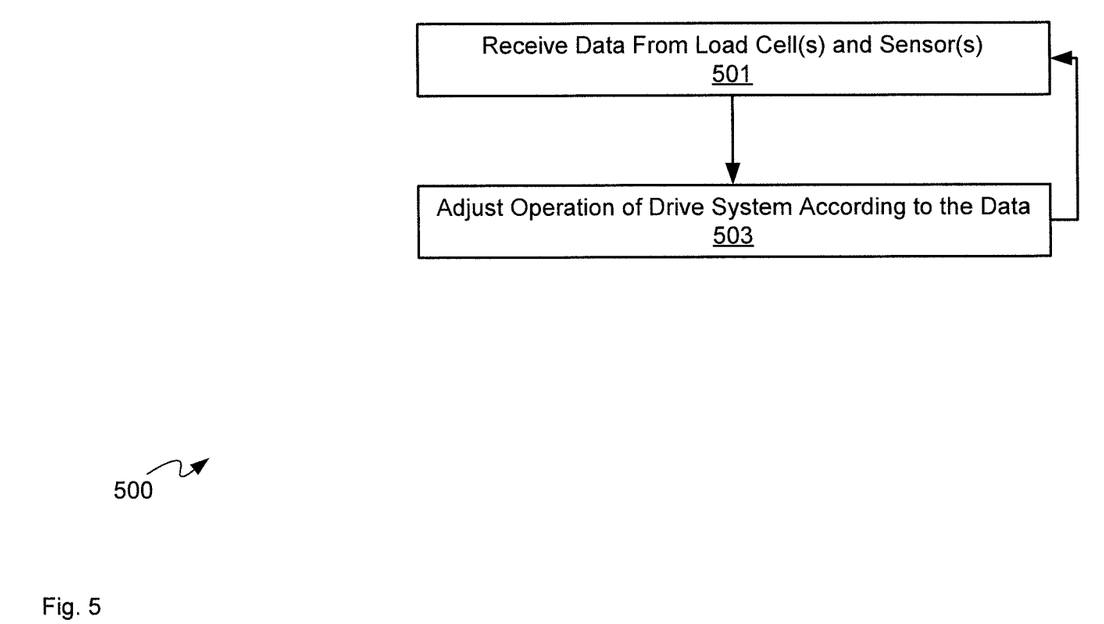
FIG. 5 depicts a flowchart of a method for controlling a mobile platform, according to non-limiting implementations.

Attention is now directed to FIG. 5 which depicts a flowchart of a method 500 for controlling platform 100, according to non-limiting implementations. In order to assist in the explanation of method 500, it will be assumed that method 500 is performed using control device 420. Indeed, method 500 is one way in which platform 100 and/or device 420 can be configured. Furthermore, the following discussion of method 500 will lead to a further understanding of platform 100 and/or control device 420 and its various components. However, it is to be understood that platform 100 and/or control device 420 and/or method 500 can be varied, and need not work exactly as discussed herein in conjunction with each other, and that such variations are within the scope of present implementations.

Regardless, it is to be emphasized, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of platform 100 and/or control device 420 as well.

At block 501, control device 420 receives data from one or more sensors 407 and one or more load cells 107. At block 503, control device 420 adjusts operation of drive system 142 according to data received from one or more sensors 407 and one or more load cells 107, including, but not limited to, when the data indicates one or more of: bumps encountered by pair of central wheels 133; and load instability. Blocks 501, 503 can be repeated in a loop. Furthermore, when the data received at block 501 indicates no bumps and/or no load instability and the like, block 503 can be optional. In other words, control device 420 generally monitors data from one or more sensors 407 and one or more load cells 107 and adjusts drive system 142 to prevent loads carried by platform 100 from tipping and/or to prevent instability of platform 100.

A determination to adjust operation of drive system 142 at block 503 can be made by comparing data from one or more sensors 407 and one or more load cells 107 to each other and/or to threshold values stored at memory 422, and/or by comparing rates of change of data from one or more sensors 407 and one or more load cells 107 to threshold rates of change. For example, data from one or more load cells 107 can indicate that a load carried by platform 100 is rocking and/or unstable and data from one or more sensors 407 can indicate that a bump has been encountered by one of central wheels 133 (e.g. data from sensors 407 at each suspension device 130 indicates a differential in force and/or strain), and hence control device 420 can slow drive system 142 to prevent the rocking and/or instability of the load from getting worse.

In any event, disclosed herein is a mobile platform for materials transport which includes a pair of suspension devices that include a pair of rocker beams which can be rotated between two positions: a first position where central wheels attached thereto can be used to drive the platform; and a second position where the central wheels are retracted and the platform can be rolled on end wheels without the friction of the central wheels and an associated drive system impeding movement of the platform. Furthermore, data from sensors and/or load cells can be used to control movement of the platform; specifically, shifts in load distribution and/or sensed forces at the suspension devices can indicate that a load (and/or materials) has shifted and/or is shifting and movement of the platform is adjusted accordingly, for example to prevent the platform and/or the load (and/or materials) from tipping.

Those skilled in the art will appreciate that in some implementations, the functionality of platform 100 and/or control device 420, can be implemented using pre-programmed hardware or firmware elements (e.g., application specific integrated circuits (ASICs), field-programmable gate arrays (FPGAs), electrically erasable programmable read-only memories (EEPROMs), etc.), or other related components. In other implementations, the functionality of platform 100 and/or control device 420, can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive, a flash drive, and the like). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A mobile platform comprising:
   a chassis comprising a first end, a second end distal the first end, and opposite sides extending therebetween;
   a pair of suspension devices located on the opposite sides, each comprising:
      a respective rocker beam, pivotally connected to a respective side, and extending from about a centre of the chassis to about the first end, and being one of a pair of rocker beams;
      a respective central wheel connected to the rocker beam at about the centre, and being one of a pair of central wheels; and,
      a respective first end wheel connected to the rocker beam at about the first end, and being one of a pair of first end wheels; and,
   one or more second end wheels located at the second end, each of the pair of rocker beams configured to rotate between at least: a first position, the pair of central wheels extending outwards from a bottom portion of the chassis in the first position, such that the chassis rolls using at least the pair of central wheels; and, a second position, the pair of central wheels retracting towards the bottom portion in the second position, such that the chassis rolls using the pair of first end wheels, and the one or more second end wheels without the pair of central wheels;
   a drive system configured to drive the pair of central wheels;
   one or more sensors positioned to sense one or more of force, a strain, and a rotation of one or more of the pair of suspension devices;
   one or more load cells configured to sense a load on the chassis; and,
   a control device in communication with the one or more sensors and the one or more load cells, the control device configured to adjust operation of the drive system according to data received from the or more sensors and the one or more load cells.

2. The mobile platform of claim 1, wherein, in the first position, the pair of central wheels, the pair of first end wheels, and the one or more second end wheels are all configured to contact ground, and in the second position, the pair of first end wheels, and the one or more second end wheels are configured to contact the ground, the pair of central wheels being retracted.

3. The mobile platform of claim 1, further comprising a pair of actuation devices configured to rotate the pair of rocker beams between the first position and the second position.

4. The mobile platform of claim 3, wherein each of the pair of actuation devices is located on a top side of the chassis, and between the pair of first end wheels and respective pivot points of the pair of rocker beams.

5. The mobile platform of claim 3, wherein the pair of actuation devices comprises a pair of jackscrews positioned in respective complementary threaded apertures in the chassis and configured to urge the pair of rocker beams from the first position to the second position when the pair of jackscrews are actuated downward, and release the pair of rocker beams from the second position to the first position when the pair of jackscrews are actuated upward.

6. The mobile platform of claim 1, wherein each of the pair of first end wheels and the one or more second end wheels comprises a respective caster wheel.

7. The mobile platform of claim 1, further comprising a further suspension device extending between the opposite sides of the chassis at the second end, the one or more second end wheels attached to the further suspension device.

8. The mobile platform of claim 1, wherein the one or more second end wheels comprises: a pair of second end wheels located at second end corners of the chassis.

9. The mobile platform of claim 1, wherein each of the pair of rocker beams further comprises a respective pivot point located between the respective central wheel and the respective first end wheel.

10. The mobile platform of claim 1, further comprising a drive system configured to drive the pair of central wheels.

11. The mobile platform of claim 10, wherein the drive system connects the pair of central wheels, and the drive system is further configured to move together with the pair of central wheels when the pair of rocker beams rotate.

12. The mobile platform of claim 11, wherein the chassis comprises a space into which the drive system can move when the pair of rocker beams rotate from the first position to the second position.

13. The mobile platform of claim 1, wherein the control device is further configured to moderate speed of the drive system when the data received from the one or more sensors and the one or more load cells indicates one or more of: bumps encountered by the pair of central wheels; and load instability.

14. The mobile platform of claim 1, further comprising one or more lift points.

15. The mobile platform of claim 1, further comprising a fairing.

16. The mobile platform of claim 1, further comprising one or more of: a remote controlled vehicle, a remote guided vehicle, a robot, and an autonomous vehicle.

17. The mobile platform of claim 1, wherein the control device is operable to:
   detect a load instability event based on the data received from at least one of at least one sensor and at least one load cell; and
   adjust a speed of the drive system in response to detecting the load instability event.

18. The mobile platform of claim 17, wherein the control device is operable to:
   determine a detected change at the at least one of the at least one sensor and the at least one load cell triggers the load instability event.

19. The mobile platform of claim 18, wherein the control device is operable to:
   determine the detected change from a shift in load distribution detected by the at least one of the at least one sensor and the at least one load cell; and
   adjust the speed of the drive system to compensate for the shift in load distribution.

20. The mobile platform of claim 18, wherein the control device is operable to:
   determine the detected change from a force differential detected by the at least one of the at least one sensor and the at least one load cell resulting from encountering rugged terrain; and
   adjust the speed of the drive system to compensate for the force differential.

* * * * *